March 3, 1964 V. W. BOLIE 3,123,825
SYSTEM FOR IMPROVING F.M.-DOPPLER RADAR
Filed Oct. 26, 1956 3 Sheets-Sheet 1
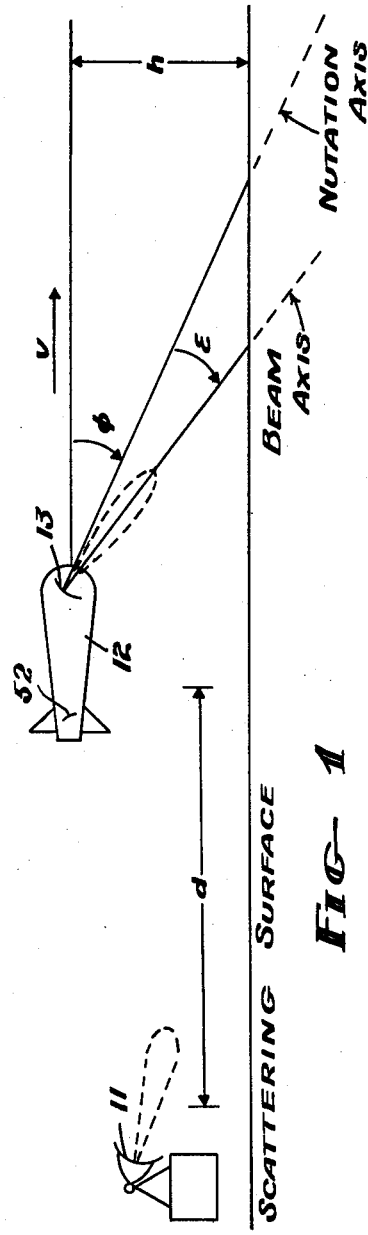
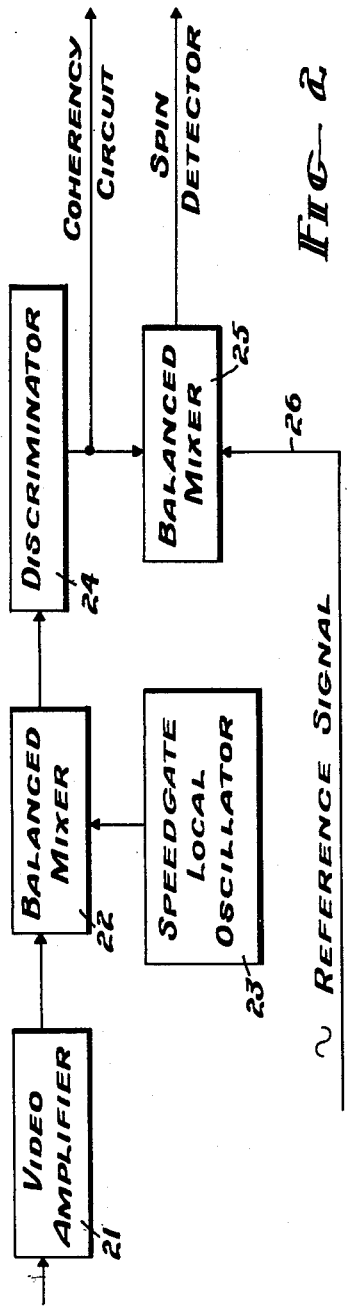
INVENTOR.
VICTOR W. BOLIE
BY Moody and Harsha
ATTORNEYS

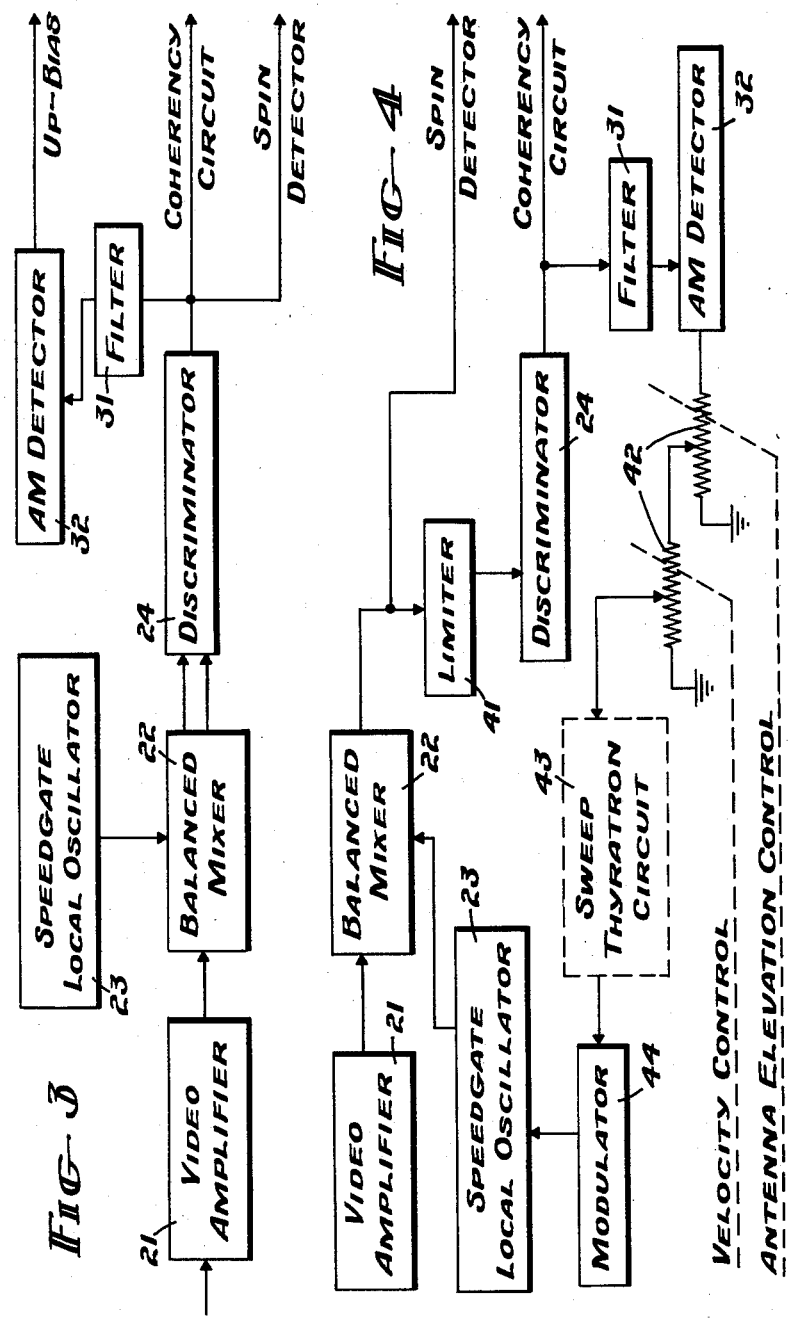

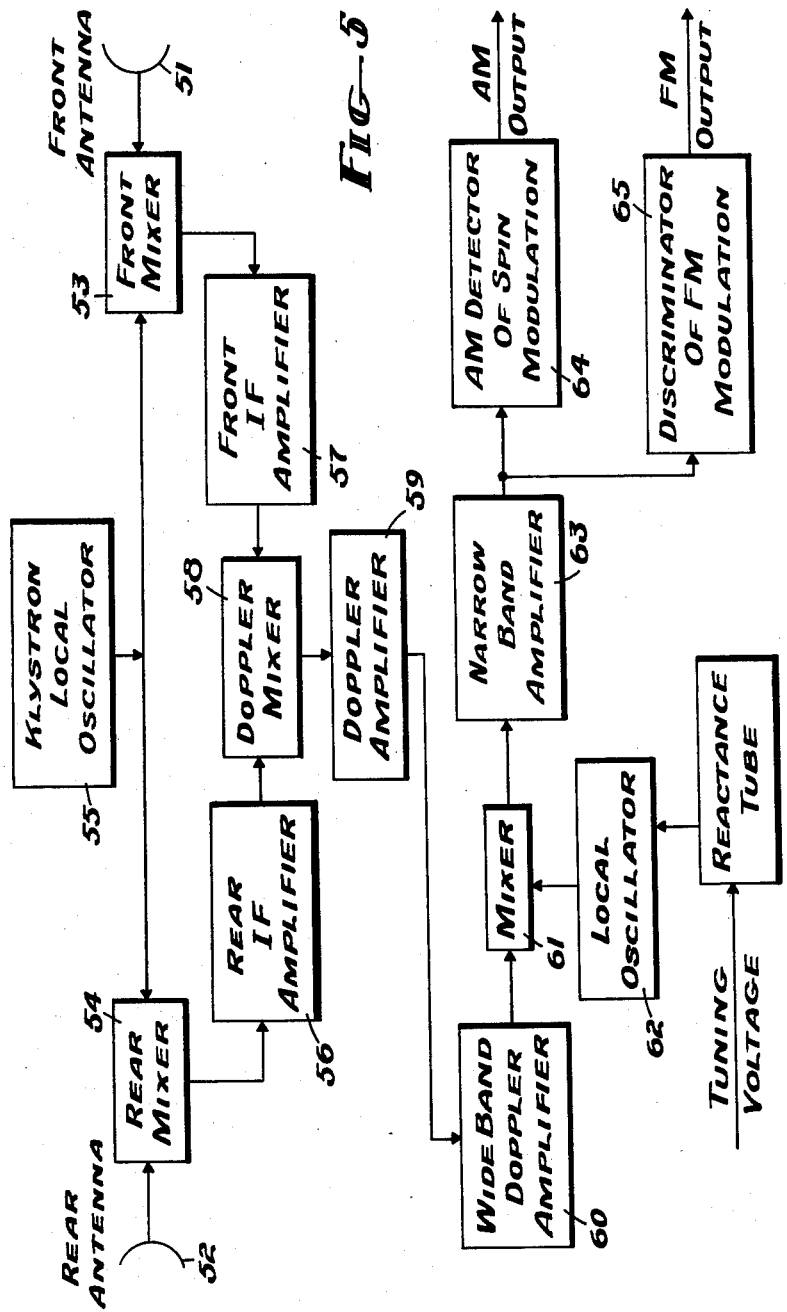

United States Patent Office 3,123,825
Patented Mar. 3, 1964

3,123,825
SYSTEM FOR IMPROVING F.M.-DOPPLER RADAR
Victor W. Bolie, Cedar Rapids, Iowa, assignor to Collins Radio Company, Cedar Rapids, Iowa, a corporation of Iowa
Filed Oct. 26, 1956, Ser. No. 618,634
2 Claims. (Cl. 343—14)

This invention relates to frequency-modulated Doppler radar systems and more particularly to improving the response characteristics of such a radar system.

One of the basic missile guidance systems employs frequency-modulated radar as a controlled system. The typical missile application of a frequency-modulated Doppler radar system includes a microwave receiver on the missile and a microwave transmitter at the launching or control site. The signal emanating from the transmitter is beamed toward the target by means of an auxiliary target-tracking system. A portion of the signal from the transmitter strikes the target and is reflected back toward the missile. A nutating antenna is located in the nose of the missile to receive the signals reflected from the target. There is normally a fixed antenna in the tail or the rear of the missile to monitor the signal from the transmitter. The signals from these two antennas are then mixed in the missile receiver and a Doppler frequency output signal developed. This Doppler frequency signal is then used to control the flight of the missile.

The use of a frequency-modulated Doppler radar system of the general type described above has a number of disadvantages. One of the primary disadvantages is interference caused by the existence of multiple targets. Another source of interference is the back scatter from the sea surface at low angles of incidence. Additionally there are adverse effects due to the frequency modulation of the signal due to the nutation of the antenna, and there may be a serious interference problem resulting from thermal noise in the receiver and transmitter.

It is an object of this invention to provide a frequency-modulated Doppler radar system which is essentially free from interference due to the sea return. It is another object of this invention to provide a frequency-modulated Doppler radar system which effectively cancels the spin modulation due to the nutation of the antenna of the mixer. It is a still further object to provide a frequency-modulated Doppler radar system which is capable of accurately steering a missile to a target. It is another object of this invention to remove the interference due to the back sea clutter in a frequency-modulated radar system.

These and other objects of this invention will become apparent when the following description is read in conjunction with the accompanying drawings, in which FIGURE 1 is a pictorial representation of the geometry of the nutating antenna of a missile;

FIGURE 2 is a block diagram of a circuit designed to remove the spin modulation in frequency-modulated Doppler radar systems;

FIGURE 3 is a block diagram of a circuit to remove the second harmonic of the interference due to sea clutter;

FIGURE 4 is a block diagram of a circuit for removing essentially all of the components of the nutation frequency; and FIGURE 5 is a block diagram of a typical frequency-modulated Doppler radar system into which this invention may be inserted.

Referring now more specifically to FIGURE 5, the missile contains a front antenna 51 and a rear antenna 52. The front antenna will pick up reflected signals from a desired target while the rear antenna will pick up signals from the transmitter. The signals which the front antenna picks up are the same signals which the rear antenna receives except that they have been reflected from the target. Each of these antennas feeds a signal into an individual mixer, the front antenna to the front mixer 53 and the rear antenna to the rear mixer 54. In addition, there is a local oscillator which in most instances will be a klystron and this klystron local oscillator 55 feeds a signal into both mixer 53 and mixer 54. The resulting signal from the rear mixer is fed to the rear IF amplifier 56 and from the front mixer to the front IF amplifier 57. In these amplifiers both the signals from the mixers are individually amplified. The output signals from the front IF amplifier 56 are connected to a Doppler mixer 58 where they are mixed, resulting in a Doppler frequency output. This Doppler signal is in effect the beat frequency between the carrier of the signal received on the front antenna and the carrier of the signal received on the rear antenna. In other words, the frequency of the carrier signal on the rear antenna differs from the transmitted frequency by an amount proportional to the frequency of the missile with respect to the transmitter. If it is assumed that the missile is merely in line with the illuminator and target, the Doppler frequency is given by the formula $$\text{Frequency}_\text{Doppler} = \frac{2V}{C} F_\text{Carrier}$$

where C is the velocity of light and V is the velocity of the missile with respect to target.

It is well known that if the original transmitter signal is frequency modulated, the resulting Doppler signal will also be frequency modulated. It is also well known that the Doppler signal will be amplitude modulated at the frequency of nutation of the front antenna if the rotation axis of the front or nutating antenna is not coincident with the direction to the target. If narrow band tuning and decoding of the amplitude and frequency modulation is required, the Doppler frequency from the Doppler amplifier 59 is fed into a wide band Doppler amplifier 60. The signal from the amplifier 60 is applied to a mixer 61 along with a voltage signal from the local oscillator 62. The combined signal from the Doppler amplifier and the local oscillator is fed into a narrow band amplifier 63. The output signal from this narrow band amplifier 63 is fed into an amplitude-modulation detector 64 and a frequency-modulation discriminator 65. The narrow band amplifier 63 may also be called a speed gate amplifier. The amplitude modulation detector and the frequency modulation discriminator may be conventional non-linear devices. The detected amplitude modulation may be used for missile steering purposes, while the demodulated or discriminated frequency modulation may be used for security and coherency checks.

One of the important causes of random fluctuation in a frequency-modulated radar signal is reflections from multiple targets, which targets are undergoing random motion. Practically the most important cases of multiple random targets result from precipitation or chaff echo caused by jamming counter measures or by sea clutter caused by surface wave motion, or, lastly, ground clutter caused by motions inherently associated with vegetation and populated areas. This invention results from a thorough analysis of multiple random targets and the characteristics of the sea's surface, but will also obviate these other sources of interference.

The composite Doppler signal for multiple fixed targets is given by the following equation:

$$G(t)=\sum_{i=1}^{n} A_i \cos\left[\frac{4\pi}{\lambda_c}R_i+\frac{4\pi}{\lambda}\frac{\Delta f}{f_c}R_i \cos \omega_m\left(t-\frac{D_i}{C}\right)\right]$$

where $A_i$=Signal amplitude from $i^{th}$ target
$R_i$=Range from missile to $i^{th}$ target
$D_i$=Distance from transmitter to $i^{th}$ target
$\lambda_c$=Wavelength of transmitter signal
$f_c$=Carrier frequency of transmitter signal
$\Delta f$=FM deviation of transmitter signal
$\omega_m$=Angular frequency of transmitter signal modulation
$C$=Velocity of light This equation may be extended to include multiple random targets by observing that the random motion of any given reflector causes fluctuation in reflected signal strength and small fluctuations in the range from the receiver to that individual reflector. As the result of extending the equation for fixed targets to random targets, the following equation results for composite Doppler signals for multiple random targets.

$$G(t)=\sum_{i=1}^{n} A_i(t) \cos\left[\frac{4\pi}{\lambda_c}\{R_i+\rho_i(t)\}\right.$$
$$\left.+\frac{4}{\lambda_c}\frac{\Delta f}{f_c}\{R_i+P_i(t)\} \cos \omega_m\{t-D_i+\rho_i(t)\}\right]$$

where $A_i(t)$=Signal amplitude from $i^{th}$ target
$R_i$=Average range from missile to $i^{th}$ target
$D_i$=Average distance from transmitter to $i^{th}$ target
$\rho_i(t)$=Random deviation of $i^{th}$ target from mean position
$\lambda_c$=Wavelength of transmitter signal
$f_c$=Carrier frequency of transmitter signal
$\Delta f$=FM deviation of transmitter signal
$\omega_m$=Angular frequency of transmitter signal modulation
$C$=Velocity of light In the above equation, the term $A_i(t)$ represents the fluctuations in signal amplitude from each target and the term $\rho_i(t)$ represents the fluctuations in the target's range. Thus it is obvious that the random motion of any individual target causes not only a fluctuation in the Doppler frequency, but also fluctuations in the amplitude and phase of the frequency modulation. Additionally, each individual Doppler signal is amplitude modulated by the fluctuations in reflected signal strength. The back scatter Doppler signal for a narrow beam antenna on a missile flying horizontally above a sea surface is given by the following equation:

$$F(t)=A[1+k \sin 2\pi f_a t] \cos\left\{2\pi\left(\frac{2f_c}{C}V \cos \psi\right) t\right.$$
$$+\left(\frac{2f_c\epsilon_0}{f_a C}V \sin \psi\right) \cos 2\pi f_a t$$
$$\left.+\frac{4\pi\beta f_m h}{C(\psi+\epsilon_0 \sin 2\pi f_a t)} \cos 2\pi f_m t\right\}$$

where $A$=Amplitude constant
$k$=Spin modulation fraction
$f_a$=Spin modulation frequency
$f_c$=Transmitter carrier frequency
$C$=Velocity of light
$h$=Flight path altitude
$V$=Missile velocity
$\psi$=Angular declination of nutation axis
$\epsilon_0$=Nutation cone half-angle
$\beta$=Index of FM applied to transmitter signal
$f_m$=Frequency of FM modulation FIGURE 1 is a pictorial representation of a missile flying horizontally above a sea surface and the angular measurements in the above equation are graphically depicted therein. The transmitter 11 is the source of the radiant energy signals which control the missile 12. The nutation axis and the beam axis are pictorially represented from the front antenna 13 on the missile.

In actual practice, due to the finite beam width of the receiving or front antenna, the Doppler signal will consist of a form of many separate signals. These separate signals correspond to reflecting points dispersed over the area of the sea intersected by the antenna beam. Elimination of this sea clutter from the Doppler signal is possible while using a narrow beam antenna of finite width. In the block diagram of the frequency-modulated radar of FIGURE 5, the output voltage of discriminator 65 is proportional to both the amplitude and the frequency deviation of the Doppler signal itself.

The output voltage from the discriminator 65 contains a large component which varies at the nutation frequency. If a limiter is placed ahead of the discriminator it may be mathematically proven that the discriminator output voltage will have a component which will vary at the nutation frequency regardless of the amount of limiting used. It may also be proven mathematically that the coding signal component is amplitude modulated by the antenna nutation.

The coding signal component of the output voltage of the discriminator contains a factor which permits the cancelling of substantially all of the spin modulation appearing on the clutter signal. Referring now to FIGURE 2, the amplifier 21 is fed into a balanced mixer 22 and combined with signals from the local oscillator 23. The output of the mixer 22 is fed to a discriminator 24. The signal from the discriminator 24 is fed to the coherency circuit and to a balanced mixer 25. The balanced mixer 25 additionally has a reference signal applied on lead 26, which is the reference signal demodulated from the rear IF channel. By inserting the balanced mixer 25 into the radar system of FIGURE 5, the ratio of the nutation cone half angle to the angular declination of the nutation axis approaches the spin modulation fraction. This makes a radar system wherein the spin detector 64 would be able to produce an output signal for a small target with no output signal for sea clutter.

If the equation for the discriminator output voltage is expanded it is found that the fundamental spin frequency and its second harmonic appear in the output of the discriminator. This second harmonic component is an indication that the output of the discriminator is due to sea clutter.

FIGURE 3 illustrates another step of this invention which will remove substantially all of the sea clutter by biasing the antenna elevation servo with a signal which is proportional to the second harmonic of the spin modulation which appears in the discriminator output signal. FIGURE 3 has many of the components of FIGURE 2, including the video amplifier 21, the balanced mixer 22, the oscillator 23, the discriminator 24, and the output circuits. Additionally, the output signal from the discriminator 24 is fed to filter 31 and then to an amplitude modulation detector 32. The output signal from the amplitude modulation detector is used to bias the antenna elevation servo.

Mathematical analysis of the expanded equation of the discriminator output voltage shows that the discriminator output in FIGURES 2 and 3 still contains a component of nutation frequency. This component may be shown to have an amplitude proportional to the missile velocity and proportional to the rotation axis declination angle. This component may be used to cause the local oscillator to resume its sweep. This will permit control of all the necessary components of nutation frequency.

FIGURE 4 is a block diagram of a system designed to remove this last component. FIGURE 4 contains the video amplifier 21, the balanced mixer 22, the oscillator 23, and the discriminator 24. Additionally, there has been placed a limiter 41 between the balanced mixer 22 and the discriminator 24. The mixer 41 effectively expands the discriminator output signal so that the second harmonic components are present and the nutation frequency component is also present. The signal through the filter 31 to the amplitude modulation detector 32 is the same as that shown in FIGURE 3 and is used to bias the antenna elevation control. The signal for this antenna elevation control is fed through a potentiometer network 42 to a sweep thyratron circuit 43. The potentiometer network 42 is adjusted and controlled by the velocity and the head angle signals. The output from the sweep thyratron circuit is fed to a modulator 44 and then to the local oscillator 23 to cause resumption of the sweeping of the speed gate local oscillator. Thus, the basic missile radar system of FIGURE 5 is modified by this invention as shown in FIGURE 4 to remove sea clutter almost completely from the output signals of the radar system.

Although this invention has been described with respect to a particular embodiment thereof, it is not to be so limited, as changes and modifications may be made therein which are within the full intended scope of the invention, as defined by the appended claims.

I claim:

1. A guided missile control system including a source of radiant energy, target means for reflecting said radiant energy, a missile, a frequency-modulated Doppler radar system mounted in said missile including a pair of antennas pointing forwardly and rearwardly on said missile, the rearwardly-pointing antenna receiving signals from the source of radiant energy, the forwardly-pointing antenna comprising a nutating antenna which receives signals reflected from the target, a first pair of mixers receiving inputs from said antennas, a local oscillator supplying inputs to said first pair of mixers, a Doppler mixer receiving inputs from the first pair of mixers and producing a Doppler signal, means for removing interference from said Doppler signal comprising a fourth mixer receiving the output of the Doppler mixer, a second local oscillator supplying an input to the fourth mixer, an amplitude-modulation detector connected to the output of the fourth mixer, and a discriminator connected to the output of the fourth mixer.

2. A guided missile control system including a source of radiant energy, target means for reflecting said radiant energy, a missile, a frequency-modulated Doppler radar system mounted in said missile including a pair of antennas pointing forwardly and rearwardly on said missile, the rearwardly-pointing antenna receiving signals from the source of radiant energy, the forwardly-pointing antenna comprising a nutating antenna which receives signals reflected from the target, a first pair of mixers receiving inputs from said antennas, a local oscillator supplying inputs to said first pair of mixers, a Doppler mixer receiving inputs from the first pair of mixers and producing a Doppler signal, means for removing interference from said Doppler signal comprising a fourth mixer receiving the output of the Doppler mixer, a second local oscillator supplying an input to the fourth mixer, a reactance tube connected to the second local oscillator, an amplitude-modulation detector connected to the output of the fourth mixer, and a discriminator connected to the output of the fourth mixer.

References Cited in the file of this patent

UNITED STATES PATENTS 2,537,597  Martinelli _____ Jan. 9, 1951